(12) United States Patent
Charron et al.

(10) Patent No.: US 12,068,843 B1
(45) Date of Patent: Aug. 20, 2024

(54) WAVELENGTH DIVISION MULTIPLEXING (WDM) APPROACH TO PHASE LOCK DISTRIBUTED DIGITAL AND RF ELECTRONICS OVER FIBER

(71) Applicant: Rockwell Collins, Inc., Cedar Rapids, IA (US)

(72) Inventors: Kyle Charron, Vergennes, VT (US); Jesslyn Coghlan, North Liberty, IA (US); Phillip J. Nadolny, Cedar Rapids, IA (US); Brishty Som, Cedar Rapids, IA (US); Joseph T. Graf, Center Point, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 29 days.

(21) Appl. No.: 17/955,297

(22) Filed: Sep. 28, 2022

(51) Int. Cl.
*H04J 14/02* (2006.01)

(52) U.S. Cl.
CPC .................. *H04J 14/0227* (2013.01)

(58) Field of Classification Search
CPC ...................................................... H04J 14/02
See application file for complete search history.

(56) References Cited

U.S. PATENT DOCUMENTS

| | | | |
|---|---|---|---|
| 5,668,652 A | 9/1997 | Hashomoto et al. | |
| 9,031,419 B2 | 5/2015 | Woodward et al. | |
| 9,184,842 B2 | 11/2015 | Dahlfort et al. | |
| 10,382,846 B2 | 8/2019 | Barad | |
| 10,893,343 B2 | 1/2021 | Barad et al. | |
| 2020/0371245 A1* | 11/2020 | Murphy | G01S 19/30 |
| 2021/0250095 A1* | 8/2021 | Wojnar | H04B 10/25752 |
| 2022/0085886 A1* | 3/2022 | Hijimiri | H04B 10/69 |

FOREIGN PATENT DOCUMENTS

| | | |
|---|---|---|
| AU | 2020202404 A1 | 12/2020 |
| EP | 2963846 A1 | 1/2016 |
| EP | 3327474 B1 | 6/2020 |
| EP | 3480973 B1 | 6/2020 |
| GB | 2383707 B | 3/2005 |
| WO | 2001026263 A2 | 4/2001 |

* cited by examiner

Primary Examiner — Shi K Li
(74) Attorney, Agent, or Firm — Suiter Swantz IP

(57) ABSTRACT

A system and method for transmission and receipt of signals within a distributed system are disclosed. In the distributed system there may be a plurality of digital and radio frequency (RF) electronics. The plurality of digital electronics may be coupled to the plurality of radio frequency electronics with at least one fiber optic cable. The at least one fiber optic cable may support wavelength division multiplexing (WDM). Further, the digital electronics may combine a time-at-the-tone signal, a pulse per second signal, and a standard frequency reference signal via amplitude modulation to produce a single complex wave. The single complex wave and other signals may be simultaneously transmitted along the at least one fiber optic cable to the plurality of RF electronics via WDM.

18 Claims, 6 Drawing Sheets

WAVELENGTH DIVISION MULTIPLEXING (WDM) APPROACH TO PHASE LOCK DISTRIBUTED DIGITAL AND RF ELECTRONICS OVER FIBER

TECHNICAL FIELD

Broadly, the present disclosure relates to open systems architecture, signal generation, transmission, and detection, and fiber optic cables.

BACKGROUND

Open systems architecture (OSA) is a systems design approach defined by modular architectural components capable of interfacing with other modular architectural components via open interface standards. Benefits of OSA may include increased interoperability of components, reduced vendor-lock and obsolescence, and reduced cost to integrate new capabilities. However, in the context of certain vehicles, OSA (and the like), may require, e.g., the decoupling of waveform processing from radio frequency (RF) processing. For example, different service branches may have different decoupled component requirements. As, for example, there are advantages to having the MFA close to the MFP or having the MFA distributed across the platform (to reduce weight associated with, e.g., coax cable runs). Connections between digital and RF electronics required for intercommunication pose significant weight concerns. Thus, it would be beneficial to have a distributed communications system that minimized unnecessary weight in its components.

SUMMARY

A system is disclosed.

In embodiments, the system includes a plurality of line-replaceable units including at least one multi-function processor (MFP) comprising at least one digital waveform configured to send and receive communications data via baseband in-phase and quadrature (I/Q) modulations. For example, digital transmission of baseband I/Q or analog RF over fiber support (where one of the sub-channels transmits an IF signal that can be translated by the MFA to the appropriate frequency). In at least one embodiment, at least one oscillator configured to generate a standard frequency reference signal with an amplitude (a frequency reference provides a wide tunable frequency range); at least one time processor configured to receive a serial time data stream signal from a global positioning system (GPS) unit (or to manage a local concept of time), generate a pulse per second (PPS) signal, and transmit the serial time data stream signal and the PPS signal to at least one time-at-the-tone amplitude modulation (TATT AM) modulator; the TATT AM modulator configured to modulate the amplitude of the standard frequency reference signal in proportion to the amplitude of the serial time data stream signal to produce a modulated reference; at least one multi-mode fiber modulator configured to receive and transmit the complex wave and the baseband I/Q modulations; and at least one multi-function aperture (MFA) comprising at least one multi-mode fiber demodulator configured to receive the complex wave and the baseband I/Q modulations, transmit the complex wave to a TATT AM demodulator, and transmit the baseband I/Q modulations to a radio frequency (RF) processor; the TATT AM demodulator configured to receive the complex wave, separate the complex wave into the serial time data stream signal, the PPS signal, and the standard frequency reference signal, transmit the serial time stream signal and the PPS signal to a sequencer, and transmit the standard frequency reference signal to the RF processor; and at least one sequencer (e.g., modulator and/or modem) configured to transmit control/status data to the RF processor; and the RF processor configured to send the baseband I/Q modulations, the serial time stream, the PPS signal, and the accurate frequency reference to at least one antenna (e.g., a data link); at least two optical transceivers configured to convert digital signals to optical signals; and at least one fiber optic cable configured to transmit signals between the at least one MFP and the at least one MFA. In other embodiments, e.g., in addition to a Freq Ref and the TATT receiver at the MFA, also include, e.g., transmitters from the MFA to the MFP for received I/Q data and status.

In some embodiments, the baseband I/Q modulations, the PPS, the serial time data stream signal, and the complex wave signals may each be at least one of: digital signals, RF signals, and/or intermediate frequency (IF) signals.

In some embodiments, the at least one MFP may be configured to process digital signals.

In some embodiments, the at least one MFA may be configured to process RF signals.

In some embodiments, the at least one MFA may be a plurality of MFAs.

In some embodiments, the plurality of MFAs may be distributed throughout a chassis and/or platform distributed throughout a vehicle or structure.

In some embodiments, the fiber optic cable may support wavelength dimensioning multiplexing (WDM).

In some embodiments, the WDM may be one of at least: coarse WDM (CWDM) or a dense WDM (DWDM).

In some embodiments the fiber optic cable may be configured to at least transmit the I/Q modulations at a first wavelength from a first optical transceiver to a second optical transceiver, transmit the TATT signal at a second wavelength from the first optical transceiver to the second optical transceiver, transmit the I/Q modulations at a third wavelength from the second optical transceiver to the first optical transceiver, transmit a transmitter/receiver control signal at a fourth wavelength from the first optical transceiver to the second optical transceiver, and transmit a transmitter/receiver status signal at a fifth wavelength from the second optical transceiver to the first optical transceiver.

A method is also disclosed for phase locking at least one digital electronic and at least one RF electronic. For example, phase lock the one or more MFAs to the MFP so as to require a single Freq Ref. In embodiments, the method includes generating multiple signals for transmission by an MFP to an MFA, further including generating baseband I/Q modulations by at least one digital waveform; transmitting the baseband I/Q modulations from the at least one digital waveform to at least one multi-mode fiber modulator; generating at least one standard frequency reference signal by at least one oscillator (with a single oscillator currently preferred); transmitting the at least one standard frequency reference signal to at least one TATT modulator (a single TATT modulator is currently preferred); receiving a serial time data stream signal from a GPS unit (or local time concept) at a time processor; generating a PPS signal at the time processor; transmitting the serial time data stream signal and the PPS signal from the time processor to the TATT modulator; modulating the serial time data stream signal, the PPS signal, and the at least one standard frequency reference to produce a modulated waveform; and transmitting the modulated waveform from the TATT modulator to the at least one multi-mode fiber modulator; transmitting the multiple signals from the MFP to the MFA, further comprising transmitting the multiple signals from the at least one multi-mode fiber modulator to a first optical transceiver; converting the multiple signals to optical signals; transmitting the optical signals to a second optical transceiver via a fiber optic cable; converting the optical signals back to the multiple signals; and transmitting the multiple signals to at least one multi-mode fiber demodulator; receiving the multiple signals at the at least one MFA, further comprising demodulating the multiple signals at the multi-mode fiber demodulator to produce the complex wave and the baseband I/Q modulations; transmitting the baseband I/Q modulations from the multi-mode fiber demodulator to a RF processor; transmitting the complex wave from the multi-mode fiber demodulator to a TATT AM demodulator; demodulating the complex wave at the TATT AM demodulator to produce the standard frequency reference, the serial time stream, and the PPS signal; transmitting the standard frequency reference signal to the RF processor; transmitting the serial time stream and the PPS signal to a sequencer; processing the serial time stream and the PPS signal at the sequencer to produce a control/status signal; and transmitting the control/status signal to the RF processor; and transmitting the control/status signal, the baseband I/Q modulations, and the standard frequency reference to at least one antenna (e.g., a data link).

In some embodiments, the baseband I/Q modulations, the PPS, the serial time data stream signal, and the complex wave signals may each be at least one of: digital signals, RF signals, and/or intermediate frequency (IF) signals.

In some embodiments, the at least one MFP may be configured to process digital waveforms.

In some embodiments, the at least one MFA may be configured to process RF signals.

In some embodiments, the at least one MFA may be a plurality of MFAs.

In some embodiments, the plurality of MFAs is distributed throughout a chassis and/or platform distributed throughout a vehicle or structure.

In some embodiments, the fiber optic cable supports WDM.

In some embodiments, the WDM is one of at least: CWDM or DWDM.

In some embodiments, the at least one fiber optic cable is configured to at least transmit the I/Q modulations at a first wavelength from a first optical transceiver to a second optical transceiver, transmit the TATT signal at a second wavelength from the first optical transceiver to the second optical transceiver, transmit the I/Q modulations at a third wavelength from the second optical transceiver to the first optical transceiver, transmit a transmitter/receiver control signal at a fourth wavelength from the first optical transceiver to the second optical transceiver, and transmit a transmitter/receiver status signal at a fifth wavelength from the second optical transceiver to the first optical transceiver. In some currently preferred embodiments, transmit I/Q data and receive I/Q data may be sent on one wavelength (or on one fiber). Likewise, the control and status data can also be sent on one wavelength (or another fiber). In such embodiments, the TATT and Ref would be on a separate wavelength (or on a third fiber). The currently preferred embodiment utilizes a single fiber using WDM.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1A:
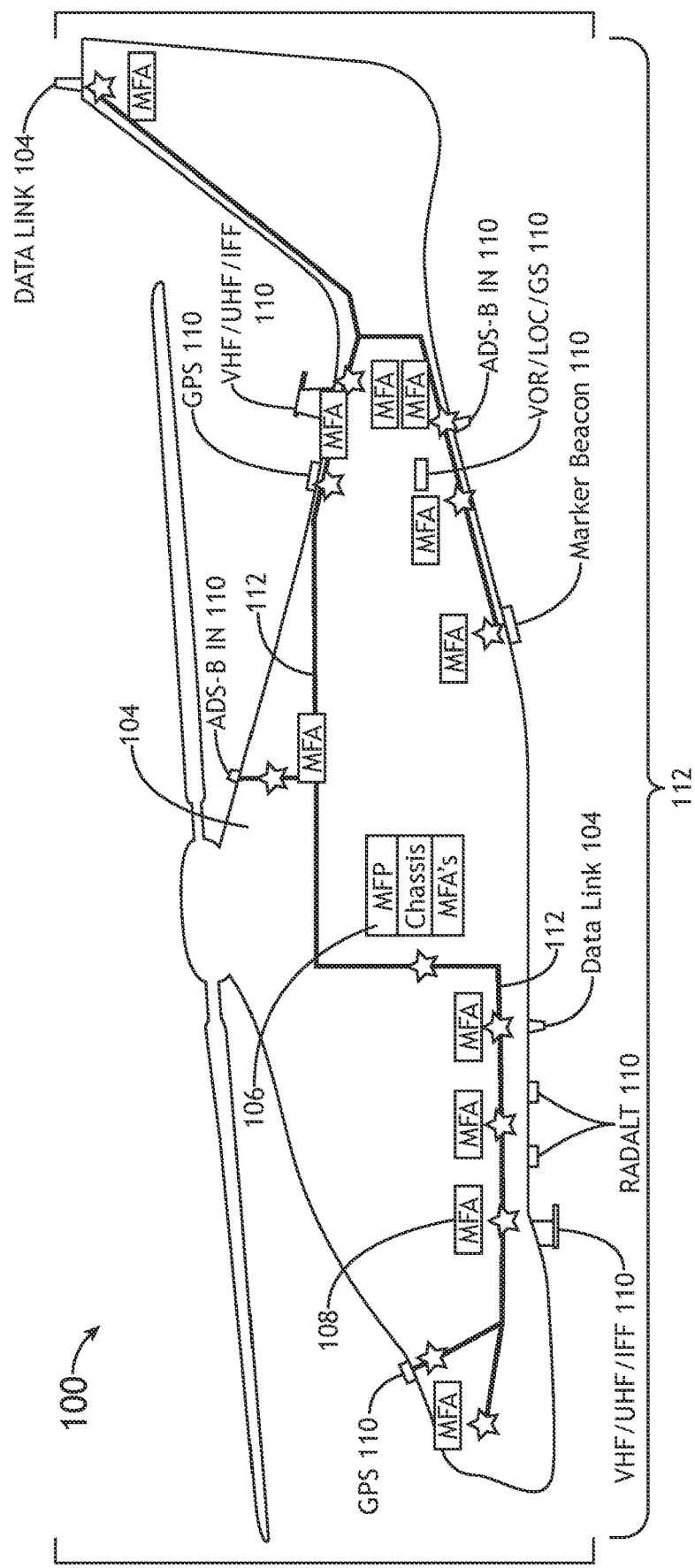
FIG. 1A illustrates a side perspective view of a distributed communications system, in accordance with example embodiments of this disclosure.

Reference will now be made in detail to the subject matter disclosed, which is illustrated in the accompanying drawings.

Before explaining one or more embodiments of the disclosure in detail, it is to be understood that the embodiments are not limited in their application to the details of construction and the arrangement of the components, steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of or sub-combination of two or more such features, along with any other features which may not necessarily be expressly described or inherently present in the instant disclosure.

A system and method for distributing signals between digital and radio frequency (RF) electronics are disclosed.

In some embodiments, the digital and RF electronics are onboard an aircraft (or ground vehicles, e.g., a platform). Additionally, in some embodiments, the platform may utilize an open systems architecture (OSA). OSA is a systems design approach defined by modular architectural components capable of interfacing with other modular architectural components via open interface standards. Benefits of OSA may include increased interoperability of components, delayed system obsolescence, and reduced implementation costs.

In some embodiments, OSA may be employed on the platform with a plurality of architectural components. These architectural components may include a plurality of line-replaceable units (LRUs). LRUs may be modular components in a system that are designed for relatively quick and easy replacement.

In some embodiments, an aircraft with a plurality of LRUs may send an accurate frequency reference to the plurality of LRUs in order to keep them phase-locked and to remove time drift. A phase-locked LRU may be defined as, e.g., an LRU that matches the frequency of an outgoing signal with the frequency of an incoming reference signal, such as a standard frequency reference signal.

Traditionally, the standard frequency reference signal is transmitted between the digital and RF electronics via a copper coaxial cable. However, given weight constraints, copper coaxial cables may be undesirable for some platforms utilizing OSA. Therefore, it would be beneficial to have a way to distribute such information without adding excessive weight to an aircraft.

FIGS. 1A-4 in general illustrate a system and method for phase-locking digital and RF electronics by employing wavelength division multiplexing (WDM) fiber optic cables, in accordance with one or more embodiments of the disclosure.

FIG. 1A illustrates a system 100 with a plurality of LRUs 102 in a platform 104, in accordance with one or more embodiments of the present disclosure. Each LRU 102 may be one of at least: a multifunction processor LRU (MFP) 106 or a multifunction aperture LRU (MFA) 108. As illustrated in FIG. 1C, in some embodiments, the plurality of LRUs 102 may be distributed throughout the platform datalink 104.

The MFP 106 may serve as a centralized processor in the system 100. The MFP may perform waveform processing and supply data to and consume data from a plurality of MFAs 108. Each MFA 108 may be responsible for processing RF signals from at least one antenna 110. Examples of an MFA 108 include, but are not limited to, very high frequency (VHF), ultra-high frequency (UHF), Identification Friend or Foe (IFF), Radar Altimeter (RADALT), a Data Link such as Link-16), Marker Beacon, very high frequency omni directional range (VOR), localizer (LOC), glide scope (GS), Automatic Dependent Surveillance—Broadcast In (ADS-B IN), and global positioning system (GPS) antennas.

In some embodiments, the plurality of MFAs 108 is coupled to the MFP 106 via a fiber optic cable 112. A fiber optic cable 112 is a cable containing at least one optical fiber, which may be manufactured with glass, plastic, or the like. Fiber optic cables 112 may send optical signals via the at least one optical fiber. In some embodiments, the fiber optic cable 112 may be a multi-mode fiber optic cable, which may allow for simultaneous communication of multiple signals. Further, the fiber optic cable 112 may utilize WDM, which may increase the capacity of a fiber optic cable 112 by transmitting multiple signals at different wavelengths along a single fiber optic cable fiber.

WDM may be subcategorized as coarse WDM (CWDM) or dense WDM (DWDM). CWDM is a form of WDM that may accommodate eight waves spaced 20 nm apart from 1470 nm to 1610 nm. DWDM may utilize smaller wavelength spacing than CWDM, such as, e.g., 1.6 nm, 0.8 nm, 0.4 nm, or 0.2 nm, and may accommodate 160 waves or more from 1525 nm to 1610 nm.

Figure 1B:
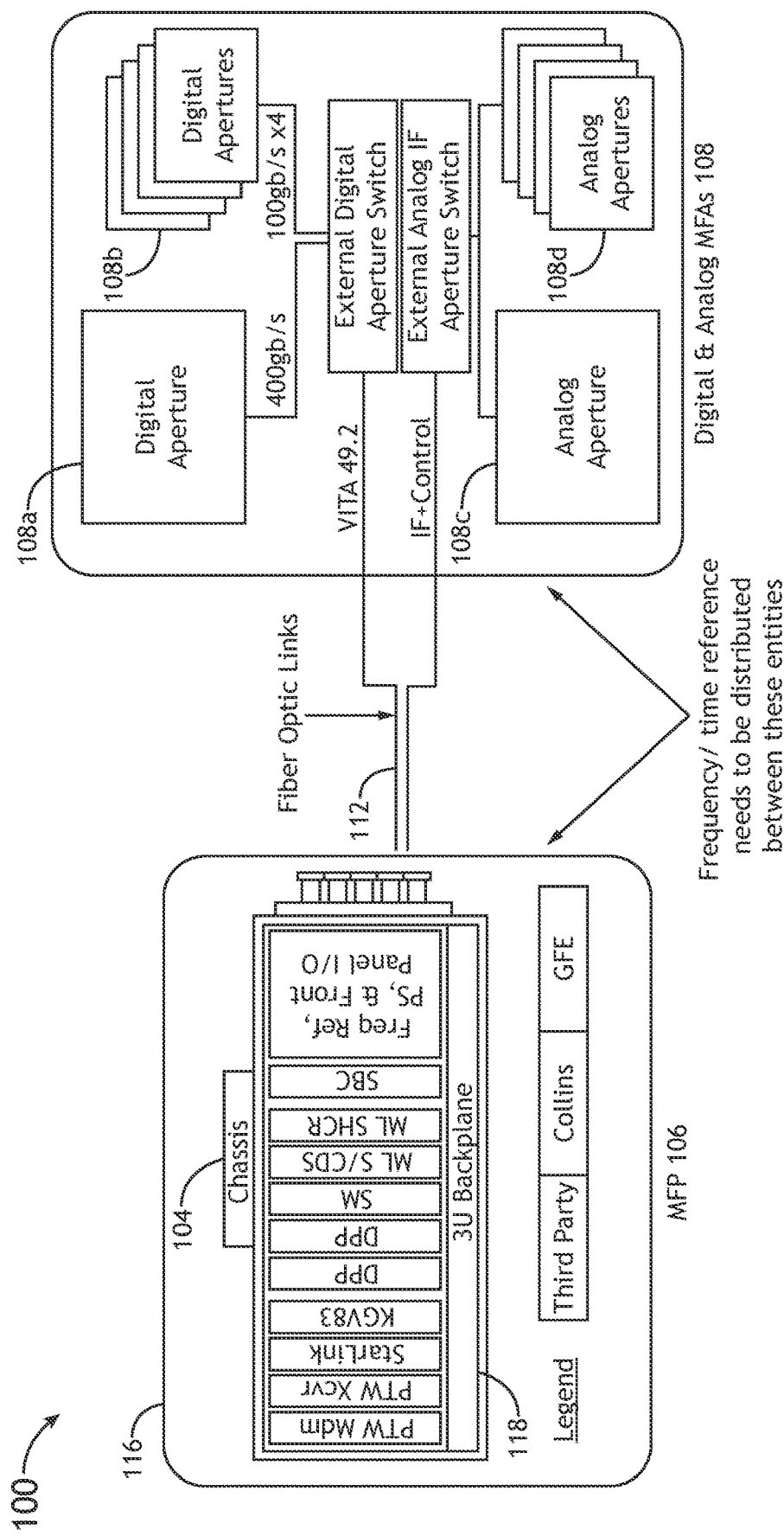
FIG. 1B is a block diagram illustrating a multifunction processor (MFP) in communication with a plurality of multifunction apertures (MFAs) in a distributed communications system, in accordance with example embodiments of this disclosure.
Figure 1C:
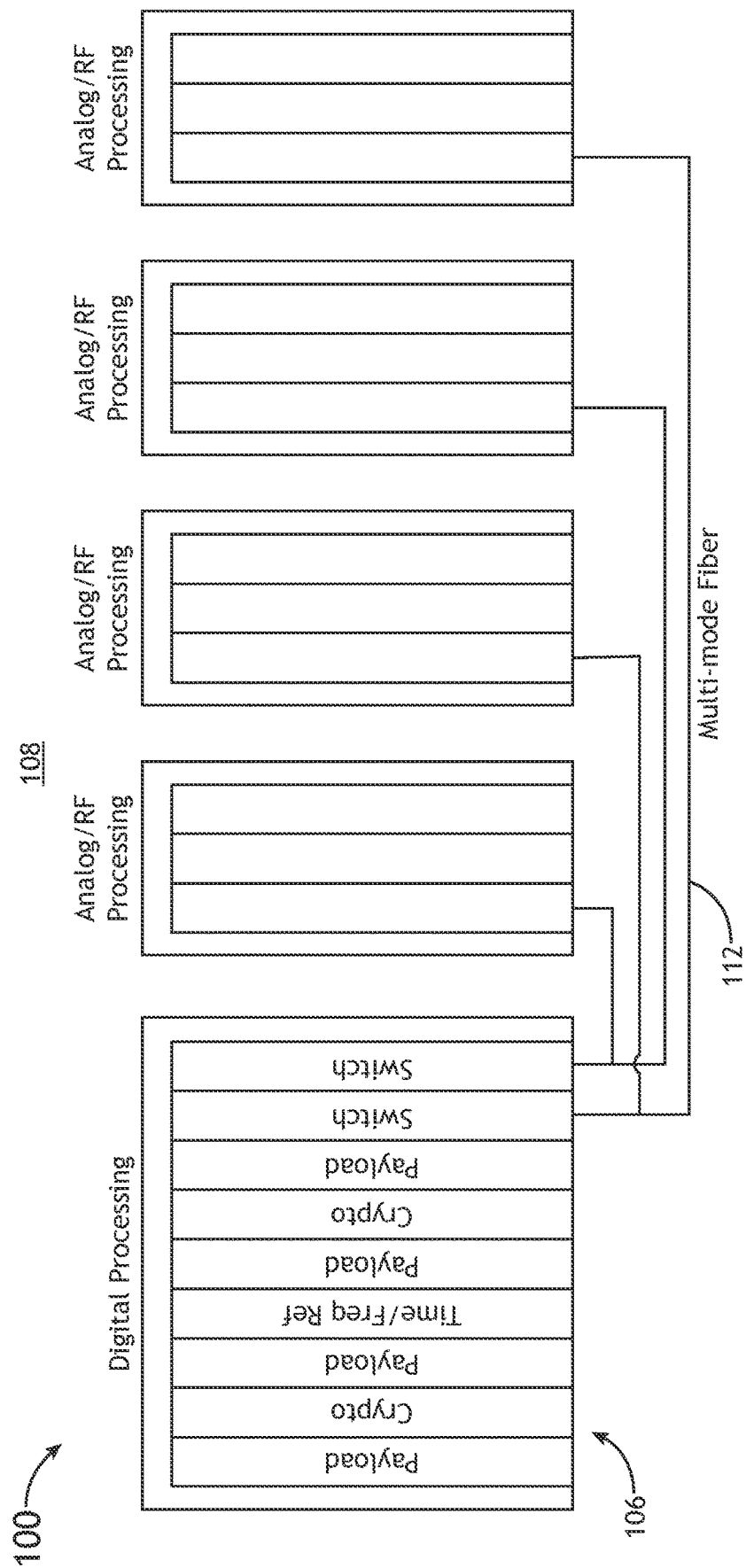
FIG. 1C is a block diagram illustrating the MFP in communication with the plurality of MFAs in a distributed communications system, in accordance with example embodiments of this disclosure.

Referring now to FIG. 1B, the system 100 is depicted with a block diagram, in accordance with some embodiments of the present disclosure. The MFP 106 is coupled to the MFAs 108 via a fiber optic cable 112. Within the MFP 106 are a plurality of MFP components 116. The plurality of MFP components 116 may include, for example, a protected tactical waveform (PTW) modem, a PTW transceiver, a SATCOM modem (or the like) router, a cryptographic processor, a streaming multiprocessor, a multilevel security/cross domain security processor, a single board computer (SBC), MLSHCR, a frequency reference processor, a PS, and/or a front input/output panel. As depicted by FIG. 1C, the plurality of processors also may consist of, e.g., payload processors, cryptographic processors, and/or time/frequency reference processors. Additionally, there may be one or more switches connecting the MFP 106 to a fiber optic cable 112. The plurality of MFP components 116 are coupled to a 3U backplane 118.

Referring again to FIG. 1B, within the MFA 108 is a plurality of MFAs, such as 108a, 108b, 108c, 108d. Each MFA 108 may be either a digital or an analog aperture. For example, MFAs 108a, 108b are digital apertures, while MFAs 108c, 108d are analog apertures. A multimode fiber optic cable 112 couples the plurality of MFAs 108 to the MFP 106 and transmits a plurality of signals between the plurality of MFAs 108 and the MFP 106.

Figure 2:
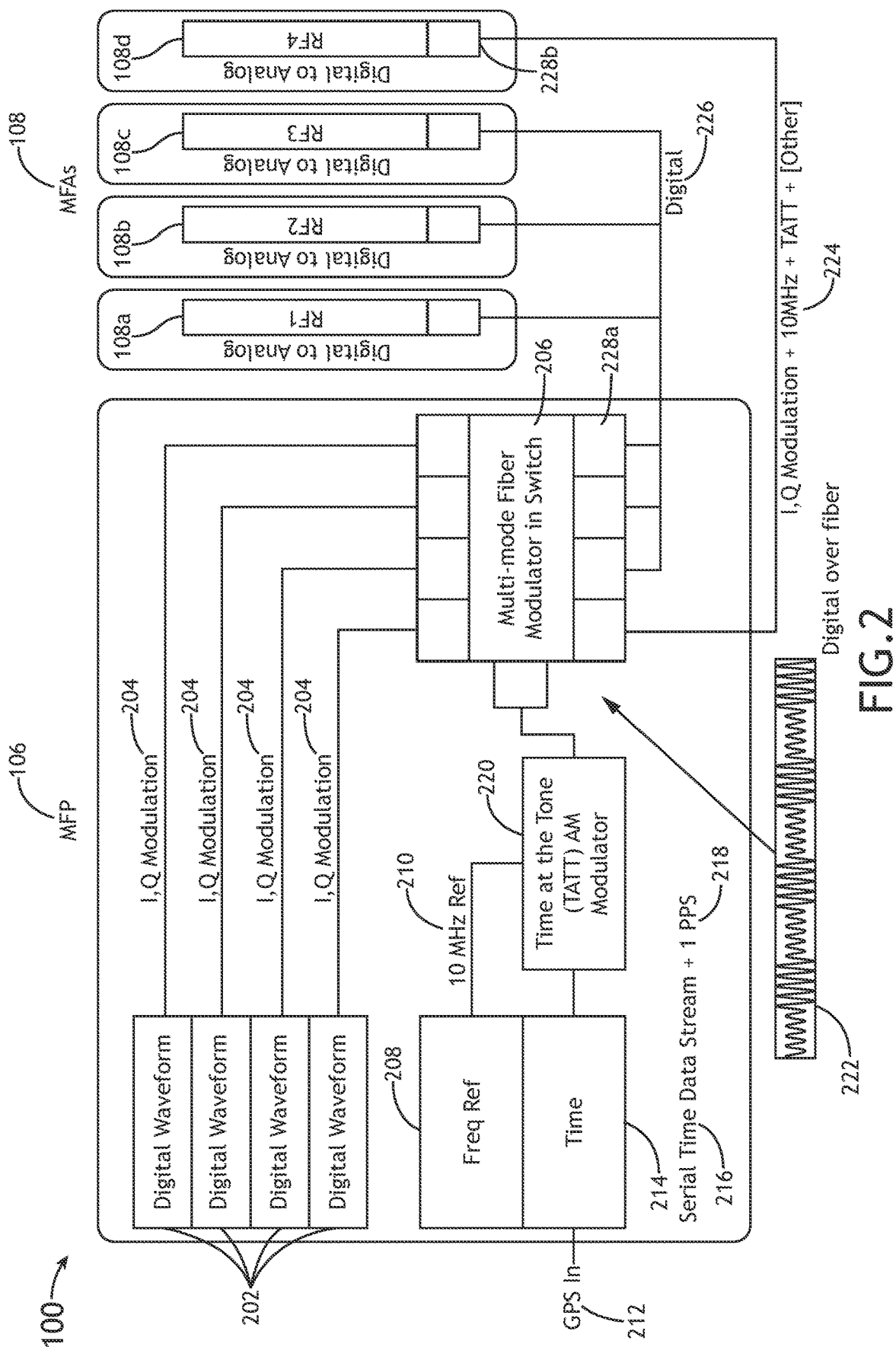
FIG. 2 is a block diagram illustrating the MFP in communication with the plurality of MFAs in a distributed communications system, in accordance with example embodiments of this disclosure.

FIG. 2 is a block diagram depicting the transmission of signals 204, 210, 216, 218 from the MFP 106 to the plurality of MFAs 108 in the system 100, in accordance with some embodiments of the present disclosure.

Within the MFP 106 there may be a plurality of digital waveforms 202, an oscillator 208, a time processor 214, a TATT amplitude modulation (AM) modulator 220, and a multimode fiber modulator 206. The plurality of digital waveforms 202 may transmit a variety of signals to the multimode fiber modulator. These signals may be transmitted as in phase and quadrature (I/Q) modulations 204.

In some embodiments, the oscillator 208 may generate a standard reference frequency signal 210. For example, a standard frequency reference signal 210 may be in the range of 3-5 kHz for a narrowband waveform or in the range of 10-200 MHz for a wideband waveform (0.01 PPM or better currently preferred). A time processor 214 may also receive a serial time data stream signal 216 from a GPS antenna 212. The serial time data stream signal 216 may be a chronologically sequential series of bits corresponding to the passage of time. The time processor 214 may further produce a pulse per second (PPS) signal 218. A PPS signal 218 may be, for example, an electrical signal that rises and falls within the span of one second and repeats each second.

In some embodiments, amplitude modulation (AM) is utilized to combine the standard frequency reference signal 210, the serial time data stream signal 216, and the PPS signal 218 into a combined frequency/TATT wave 222. In general, modulation is the process of changing some characteristic of a first waveform (carrier signal) in accordance with a second waveform (modulating signal). AM is the process of varying the amplitude of the carrier signal in accordance with an instantaneous amplitude of the modulating signal. The standard frequency reference signal 210 may serve as the carrier signal. The TATT information may be a signal transmitted once per second and indicate the time in hours, minutes, and seconds at a given tone (or other interval of time). In some embodiments, the TATT AM modulator 220 may use the standard frequency reference signal 210 as a carrier signal and the serial time data stream signal 216 and the PPS signal 218 as modulating signals to produce a combined frequency/TATT wave 222.

The combined frequency/TATT wave 222 and the I/Q modulations 204 are each transmitted to an optical transceiver 228a. An optical transceiver 228a is a device that is capable of both transmitting and receiving optic signals. The optical transceiver 228a may also be capable of converting various signal types to and from optical signals. For example, the various signal types may be digital or analog. The optical transceiver 228a may be coupled to a multimode fiber modulator 206.

The multimode fiber modulator 206 may contain and/or be coupled to at least one light source, such as a laser. The at least one light source may produce light at a certain wavelength (optical carrier wavelength). The multimode fiber modulator 206 may modulate the optical carrier wavelength in accordance with characteristics of a given signal, such as the combined frequency/TATT wave 222 or the I/Q modulations 204 to create a modulated optical carrier wavelength.

The multimode fiber modulator 206 may also contain and/or be coupled to at least one multiplexer. The at least one multiplexer may combine a plurality of modulated optical carrier wavelengths into a single complex optical signal. The single complex optical signal may then be transmitted via an optical waveguide. An optical waveguide may be any physical structure capable of transmitting electromagnetic waves in the optical spectrum. For example, the optical waveguide may be a single fiber within a multimode fiber optic cable 112. The plurality of modulated optical carrier wavelengths 224 may travel via the single fiber within a multimode fiber optic cable 112 to a plurality of MFAs 108a, 108b, 108c, 108d for further processing.

Figure 3:
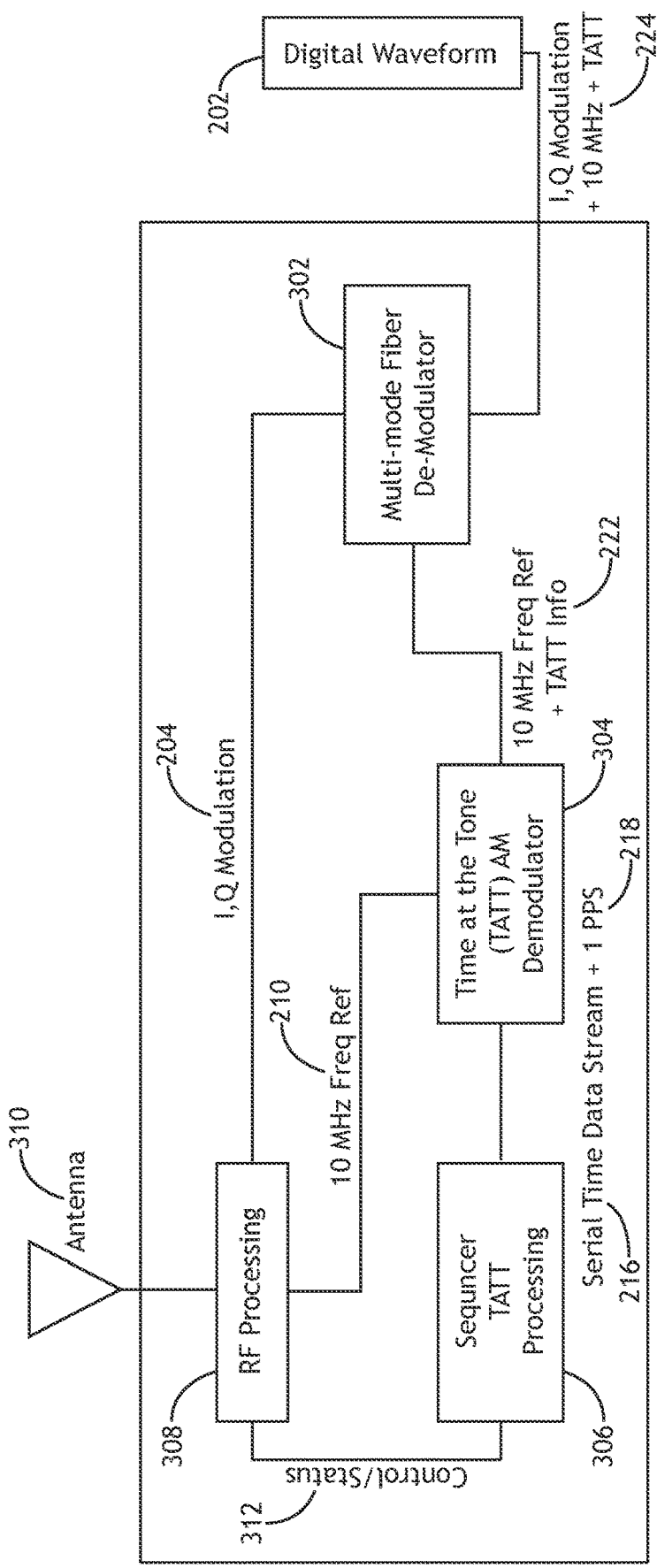
FIG. 3 is a block diagram illustrating a demodulation of a signal transmitted from the MFP to one of the plurality of MFAs, in accordance with example embodiments of this disclosure.

FIG. 3 is a block diagram illustrating the consumption 300 of the plurality of modulated optical carrier wavelengths 224 within at least one of the plurality of MFAs. For example, the MFA 108a may include at least one multimode fiber demodulator 302. The multimode fiber demodulator may contain and/or be coupled to at least one demultiplexer. The at least one demultiplexer may receive the single complex optical signal from the at least one multiplexer. Further, the at least one demultiplexer may separate the single complex optical signal into the original plurality of modulated carrier wavelengths.

The multimode fiber demodulator 302 may further convert the plurality of modulated carrier wavelengths into the plurality of optical carrier wavelengths and the plurality of modulating signals, such as the combined frequency/TATT wave 222 and the I/Q modulations 204. On one wavelength, the transmitted I/Q (204) data is sent (and may be recovered (302). This data is sent to the RF processing (308).

Another wavelength, the PPS, TATT and Frequency Reference (222) are carried (as digitally modulated AM). This may be independently recovered and sent (304) where the carrier is used to provide the frequency reference and the amplitude is decoded to provide the precise location of the PPS and the TATT information (216) and sent (306) to provide accurate time information for the sequencer. In one embodiment, control is sent as digital information on another wavelength and is independently recovered (302) and sent (306). Likewise, status information may be encoded independently (302) and sent back to the MFP, as well as received I/Q data on yet another wavelength. in a preferred embodiment, the block (302) may be a commercially available optical transceiver.

Additionally, the multimode fiber demodulator may include and/or be coupled to an optical transceiver 228b. The optical transceiver 228b may convert optical signals to and from various signal types, such as analog signals or digital signals. The multimode fiber demodulator 302 and/or the optical transceiver may transmit the combined frequency/TATT wave 222 to a TATT AM demodulator 304 and the I/Q modulations 204 to an RF processor 308.

The TATT AM demodulator 304 may be a computer program or an electronic circuit that is able to remove the envelope from a modulated wave to recover a carrier frequency and a modulating frequency. The TATT AM demodulator 304 demodulates the combined frequency/TATT wave 222 to produce the standard frequency reference signal 210, the serial time data stream signal 216, and the PPS signal 218. The TATT AM demodulator 304 may further transmit the standard frequency reference signal 210 to the RF processor 108 and the serial time data stream signal 216 and the PPS signal 218 to a sequencer 306.

In some embodiments, the sequencer 306 may process the serial time data stream signal 216 and the PPS signal 218 to generate a control/status signal 312. The control/status signal 312 may be further transmitted to the RF processor 108.

Figure 4:
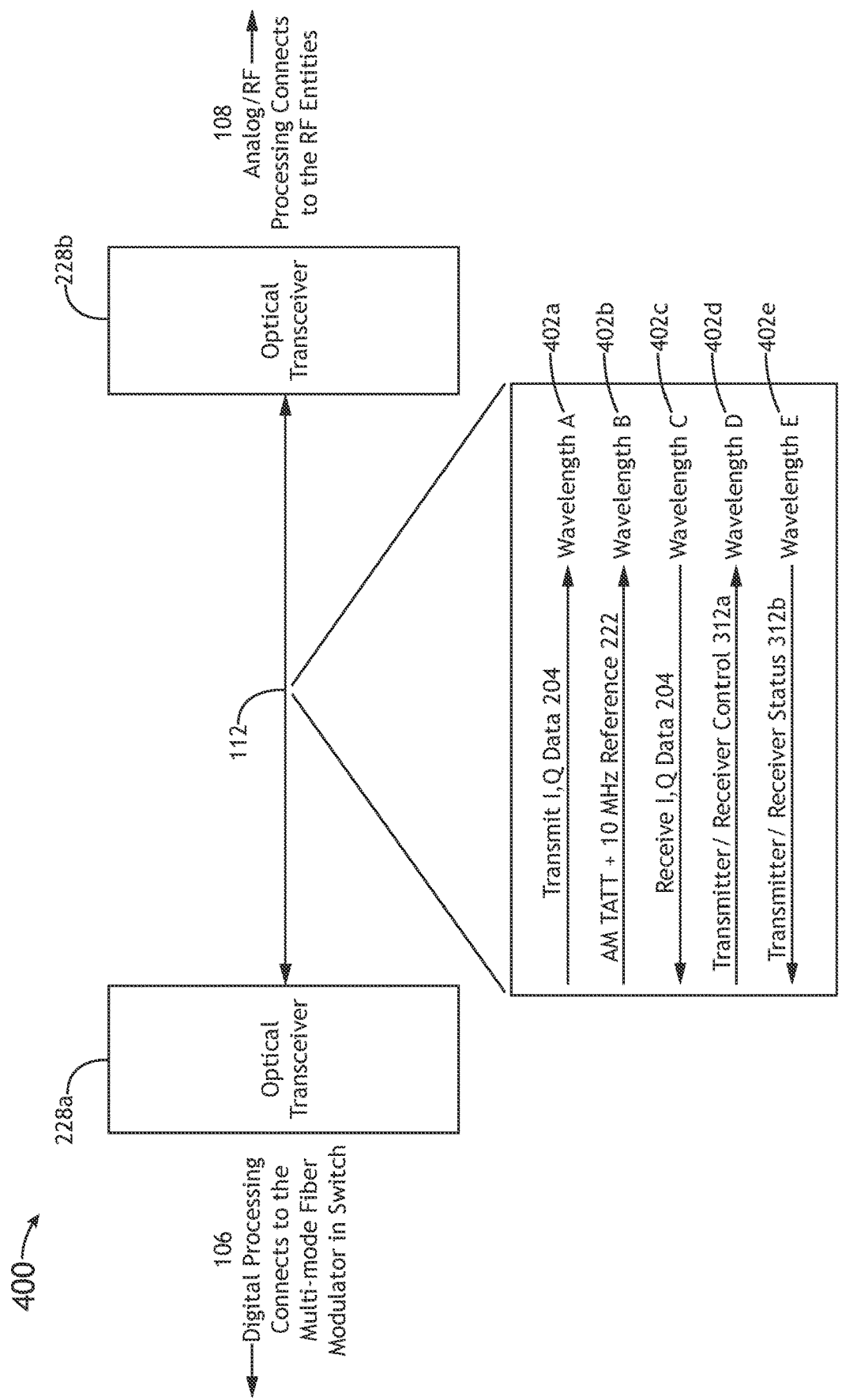
FIG. 4 is a block diagram illustrating a fiber optic cable transmitting and receiving a plurality of signals, in accordance with example embodiments of this disclosure.

FIG. 4 illustrates transmission 400 of a plurality of signals along a multimode fiber optic cable 112 utilizing WDM. For example, a system may need to transmit and/or receive five types of signals between a first optical transceiver 228a and a second optical transceiver 228b. In some embodiments, a user may wish to transmit I/Q modulations 204, the combined frequency/TATT wave 222, and a transmitter/receiver control signal 312a from the first optical transceiver 228b, and also transmit receipt of the I/Q modulations 204 and a transmitter/receiver status signal 312b from the second optical transceiver 228b to the first optical transceiver 228a.

Each of the plurality of signals may be transmitted from the first optical transceiver 228a to the second optical transceiver 228b or from the second optical transceiver 228b to the first optical transceiver 228a by modulating at least one of a plurality of optical carrier wavelengths 402.

For example, the plurality of optical carrier wavelengths may be five different optical carrier wavelengths 402. A first optical carrier wavelength 402a and a second optical carrier wavelength 402b may be modulated to transmit the I/Q modulations 204 and the combined frequency/TATT wave 222, respectively, from the first optical transceiver 228a to the second optical transceiver 228b. Additionally, a third optical carrier wavelength 402c may be used to transmit the I/Q modulations 204 from the second optical transceiver 228b to the first optical transceiver 228a. Further, a fourth optical carrier wavelength 402d may be modulated to transmit the transceiver/receiver control signal 312a from the first optical transceiver 228a to the second optical transceiver 228b. A fifth optical carrier wavelength 402e may also be modulated to transmit the transceiver/receiver status signal 312b from the second optical transceiver 228b to the first optical transceiver 228a. In other implementations and embodiments, individual fibers are dedicated to data types. The Transmitter and Receiver I/Q data can be multiplexed on the same fiber channel with a TDMA structure, as well as the Control/Status on another fiber channel. In such embodiments, only three (3) fiber channels would be needed, but at the cost of some additional complexity. The current representation shown is the lowest latency implementation (a currently preferred embodiment). Additional embodiments may multiplex all the information on a single fiber channel. In this case, the I/Q data, control/status data, and the TATT+PPS would all be modulated onto the Freq Ref.

At some time after transmission 400 of the plurality of modulated optical carrier signals, the modulated optical carrier signals 402a, 402b, 402d transmitted to the second optical transceiver 228b may further be transmitted to the plurality of MFAs (RF processor) 108 for RF processing. Likewise, the modulated optical carrier signals 402c, 402e transmitted to the first optical transceiver 228a may be further transmitted to the MFP 106 for digital processing.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed:

1. A system comprising:
    a plurality of line-replaceable units including:
        at least one multi-function processor (MFP) comprising:
            at least one digital waveform configured to send and receive communications data via baseband in phase and quadrature (I/Q) modulations;
            at least one oscillator configured to generate a standard frequency reference signal with an amplitude;
            at least one time processor configured to:
                receive a serial time data stream signal from a global positioning system (GPS) unit;
                generate a pulse per second (PPS) signal; and
                transmit the serial time data stream signal and the PPS signal to at least one time-at-the-tone amplitude modulation (TATT AM) modulator;
            the at least one TATT AM modulator configured to modulate the amplitude of the standard frequency reference signal in proportion to the amplitude of the serial time data stream signal to produce a complex wave signal;
            at least one multi-mode fiber modulator configured to receive and transmit the complex wave and the baseband I/Q modulations; and
        at least one multi-function aperture (MFA) comprising:
            at least one multi-mode fiber demodulator configured to:
                receive the complex wave and the baseband I/Q modulations;
                transmit the complex wave signal to a TATT AM demodulator; and
                transmit the baseband I/Q modulations to a radio frequency (RF) processor;
            the TATT AM demodulator configured to:
                receive the complex wave;
                separate the complex wave into the serial time data stream signal, the PPS signal, and the standard frequency reference signal;
                transmit the serial time stream signal and the PPS signal to a sequencer; and
                transmit the standard frequency reference signal to the RF processor; and
            at least one sequencer configured to transmit control/status data to the RF processor; and
            the RF processor configured to send the baseband I/Q modulations, the serial time stream, the PPS signal, and the standard frequency reference signal to at least one antenna;
    at least two optical transceivers configured to convert digital signals to optical signals; and
    at least one fiber optic cable configured to transmit signals between the at least one MFP and the at least one MFA.

2. The system of claim 1, wherein the baseband I/Q modulations, the PPS, the serial time data stream signal, and the complex wave signal are each at least one of: digital signals, RF signals, and/or intermediate frequency (IF) signals.

3. The system of claim 1, wherein the at least one MFP is configured to process digital signals.

4. The system of claim 1, wherein the at least one MFA is configured to process RF signals.

5. The system of claim 4, wherein the at least one MFA is a plurality of MFAs.

6. The system of claim 5, wherein the plurality of MFAs is distributed throughout a platform.

7. The system of claim 1, wherein the fiber optic cable supports wavelength dimensioning multiplexing (WDM).

8. The system of claim 7, wherein the WDM is one of at least: coarse WDM (CWDM) or a dense WDM (DWDM).

9. The system of claim 7, wherein the fiber optic cable is configured to at least:
- transmit the I/Q modulations at a first wavelength from a first optical transceiver to a second optical transceiver;
- transmit the complex wave signal at a second wavelength from the first optical transceiver to the second optical transceiver;
- transmit the I/Q modulations at a third wavelength from the second optical transceiver to the first optical transceiver;
- transmit a transmitter/receiver control signal at a fourth wavelength from the first optical transceiver to the second optical transceiver; and
- transmit a transmitter/receiver status signal at a fifth wavelength from the second optical transceiver to the first optical transceiver.

10. A method for phase locking at least one digital electronic and at least one RF electronic comprising:
- generating multiple signals for transmission by an MFP to an MFA, further comprising:
  - generating baseband I/Q modulations by at least one digital waveform;
  - transmitting the baseband I/Q modulations from the at least one digital waveform to at least one multi-mode fiber modulator;
  - generating at least one standard frequency reference signal by at least one oscillator;
  - transmitting the at least one standard frequency reference signal to at least one TATT modulator;
  - receiving a serial time data stream signal from a GPS unit at a time processor;
  - generating a PPS signal at the time processor;
  - transmitting the serial time data stream signal and the PPS signal from the time processor to the TATT modulator;
  - modulating the serial time data stream signal, the PPS signal, and the at least one standard frequency reference to produce a complex wave signal; and
  - transmitting the complex wave from the TATT modulator to the at least one multi-mode fiber modulator;
- transmitting the multiple signals from the MFP to the MFA, further comprising:
  - transmitting the multiple signals from the at least one multi-mode fiber modulator to a first optical transceiver;
  - converting the multiple signals to optical signals;
  - transmitting the optical signals to a second optical transceiver via a fiber optic cable;
  - converting the optical signals back to the multiple signals; and
  - transmitting the multiple signals to at least one multi-mode fiber demodulator;
- receiving the multiple signals at the at least one MFA, further comprising:
  - demodulating the multiple signals at the multi-mode fiber demodulator to produce the complex wave signal and the baseband I/Q modulations;
  - transmitting the baseband I/Q modulations from the multi-mode fiber demodulator to a RF processor;
  - transmitting the complex wave signal from the multi-mode fiber demodulator to a TATT AM demodulator;
  - demodulating the complex wave signal at the TATT AM demodulator to produce the standard frequency reference, the serial time stream, and the PPS signal;
  - transmitting the standard frequency reference signal to the RF processor;
  - transmitting the serial time stream and the PPS signal to a sequencer;
  - processing the serial time stream and the PPS signal at the sequencer to produce a control/status signal; and
  - transmitting the control/status signal to the RF processor; and
- transmitting the control/status signal, the baseband I/Q modulations, and the standard frequency reference to at least one antenna.

11. The method of claim 10 wherein the baseband I/Q modulations, the PPS, the serial time data stream signal, and the complex wave signal are each at least one of: digital signals, RF signals, and/or intermediate frequency (IF) signals.

12. The method of claim 10, wherein the at least one MFP is configured to process digital waveforms.

13. The method of claim 10, wherein the at least one MFA is configured to process RF signals.

14. The method of claim 13 wherein the at least one MFA is a plurality of MFAs.

15. The method of claim 14 wherein the plurality of MFAs is distributed throughout a platform.

16. The method of claim 10, wherein the fiber optic cable supports WDM.

17. The method of claim 16 wherein the WDM is one of at least: CWDM or DWDM.

18. The method of claim 16, wherein the at least one fiber optic cable is configured to at least:
- transmit the I/Q modulations at a first wavelength from the first optical transceiver to the second optical transceiver;
- transmit the complex wave signal at a second wavelength from the first optical transceiver to the second optical transceiver;
- transmit the I/Q modulations at a third wavelength from the second optical transceiver to the first optical transceiver;
- transmit a transmitter/receiver control signal at a fourth wavelength from the first optical transceiver to the second optical transceiver; and
- transmit a transmitter/receiver status signal at a fifth wavelength from the second optical transceiver to the first optical transceiver.

* * * * *